(No Model.)

W. H. HARRIS.
NUT LOCK.

No. 514,597. Patented Feb. 13, 1894.

Witnesses
Percy C. Bowen
John A. Wilson

Inventor
W. H. Harris
By Whitman & Wilkinson
Attorneys

UNITED STATES PATENT OFFICE.

WILLIAM H. HARRIS, OF NEWBERRY, SOUTH CAROLINA, ASSIGNOR OF ONE-HALF TO A. P. PIFER, OF SAME PLACE.

NUT-LOCK.

SPECIFICATION forming part of Letters Patent No. 514,597, dated February 13, 1894.

Application filed May 27, 1893. Serial No. 475,702. (No model.)

*To all whom it may concern:*

Be it known that I, WILLIAM HAMILTON HARRIS, a citizen of the United States, residing at Newberry Court-House, in the county of Newberry and State of South Carolina, have invented certain new and useful Improvements in Nut-Locks; and I do hereby declare the following to be a full, clear, and exact description of the invention, such as will enable others skilled in the art to which it appertains to make and use the same.

My invention relates to improvements in nut locks, and it consists of certain novel features hereinafter described and claimed.

Reference is had to the accompanying drawings, in which the same parts are indicated by the same letters throughout the several views.

Figure 1:
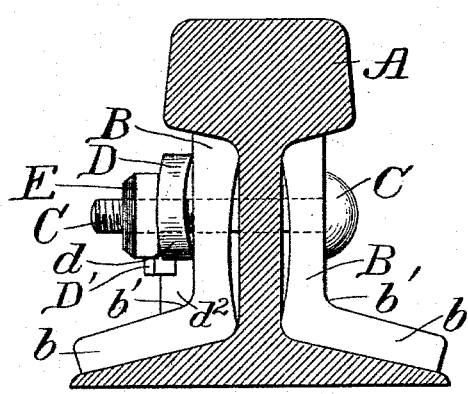
Figure 2:
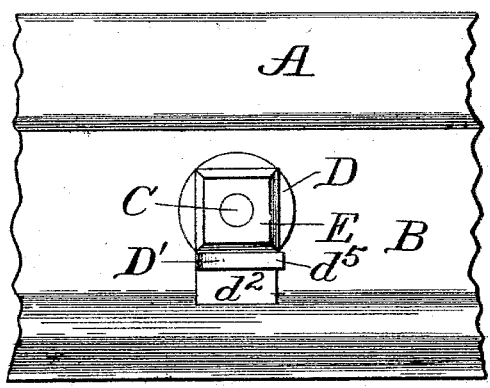
Figure 3:
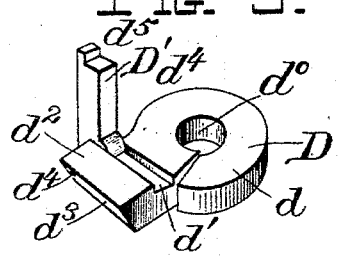
Figure 4:
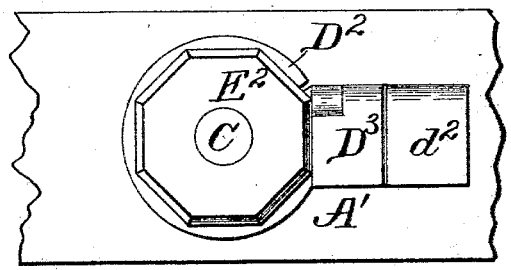
Figure 5:
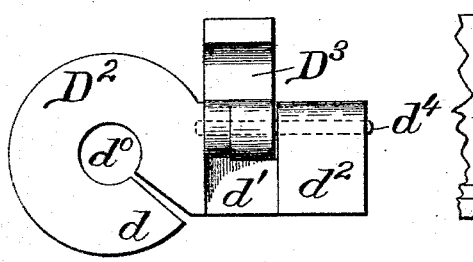
Figure 6:
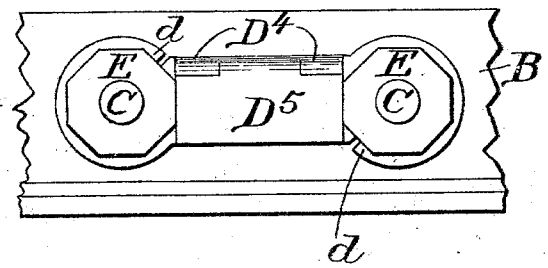
Figure 7:
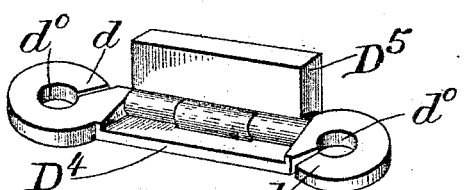

Figure 1 represents a transverse section across a rail, the fish plates, bolt, nut, and nut-lock being shown in elevation. Fig. 2 represents a side elevation of the device shown in Fig. 1. Fig. 3 represents a perspective view of the combined spring washer and nut lock shown in Figs. 1 and 2. Fig. 4 represents a side elevation of a timber and a nut mounted thereon, and represents another form of the device shown in the preceding figures. Fig. 5 represents a plan view of the combined spring washer plate and nut-lock shown in Fig. 4. Fig. 6 represents a modification of my improved device as adapted for locking two nuts, and Fig. 7 represents a perspective view of the double combined washer plate and nut lock shown in Fig. 6.

Returning to Figs. 1 to 3, A represents the rail, B the fish plates, having shoe $b$ and curved portions $b'$.

C represents the bolt, D the combined washer plate and nut-locks, and E the nut to be locked.

The combined spring washer plate and nut lock, shown in Fig. 3 has a circular opening $d^0$ to admit the bolt, a spring tongue $d$, a slot $d'$ adapted to receive the tongue D', which is pivoted on the pin $d^4$ passing through the shank $d^2$ of the washer plate. This shank $d^2$ is rounded as at $d^3$ to fit in the rounded portion $b'$ of the fish plate B. The pivoted tongue D' is provided with a lug $d^5$, so that it may be readily withdrawn, when it is desired to screw up the nut.

In the device shown in Figs. 4 and 5, the combined washer plate and nut-lock $D^2$ is attached to the beam A' in any convenient way, while the pivoted tongue $D^3$ is normally held in position by its own weight.

In the device shown in Figs. 6 and 7, the washer plate $D^4$ is provided with double spring ends, as shown, and has a hinged piece $D^5$ adapted to fall by its own weight and remain down between the two nuts holding both of the same against turning.

The operation of the various forms of my improved device is substantially the same, the tongue or pivoted portion being moved in all cases clear of the nut until the latter is screwed home and then the nut is turned back just enough to allow the tongue to be swung into position between the nut and the portion $d^2$, of the washer plate.

As it will ordinarily be impossible to have the tongue or key bear against the nut when it is exactly home, I prefer to make a tight joint by inserting a stout spring, preferably integral with the washer plate, between the nut and the article through which the bolt passes. This spring forms a part of the washer plate as shown at $d$ in the devices shown in Figs. 1, 3, and 7.

It will be seen that by the herein described device a firm, secure, and safe nut-lock is provided.

Having thus described my invention, what I claim, and desire to secure by Letters Patent of the United States, is—

A combined washer plate and nut lock, comprising a plate provided with an annular spring at one end thereof adapted to go beneath the nut and an arm projecting beyond the side of said nut, the said projecting arm being provided with a slot or groove tangent to the circle described by the lesser radius of the nut; and a tongue pivoted to said plate and adapted to fall or be swung over into said groove and so hold said nut, substantially as and for the purposes described.

In testimony whereof I affix my signature in presence of two witnesses.

WILLIAM H. HARRIS.

Witnesses:
C. J. PURCELL,
W. A. MCFALL.